United States Patent [19]

Sunouchi et al.

[11] 4,206,987
[45] Jun. 10, 1980

[54] EXPOSURE ADJUSTING DEVICE FOR CAMERA SYSTEM

[75] Inventors: Akio Sunouchi; Ryuji Tokuda, both of Tokyo; Masanori Uchidoi, Yokohama; Kenichi Kumazawa, Machida; Tomonori Iwashita, Fuchu, all of Japan

[73] Assignee: Canon Kabushiki Kaisha, Tokyo, Japan

[21] Appl. No.: 927,826

[22] Filed: Jul. 25, 1978

[30] Foreign Application Priority Data

Aug. 3, 1977 [JP] Japan .................................. 52-93499

[51] Int. Cl.$^2$ ........................... G03B 7/08; G03B 9/02; G03B 1/18
[52] U.S. Cl. ...................................... 354/44; 354/47; 354/173; 354/271
[58] Field of Search ....................... 354/36, 38, 43, 44, 354/47, 173, 271

[56] References Cited

U.S. PATENT DOCUMENTS

| | | | |
|---|---|---|---|
| 3,909,833 | 9/1975 | Sorimachi et al. | 354/44 X |
| 3,945,024 | 3/1976 | Hasegawa et al. | 354/43 X |
| 4,015,198 | 3/1977 | Iwashita et al. | 354/43 X |

Primary Examiner—Michael L. Gellner
Attorney, Agent, or Firm—Toren, McGeady and Stanger

[57] ABSTRACT

In the combination of a camera and a motor drive unit, an exposure adjusting device is provided. This exposure adjusting device is manually controllable either by rotating a diaphragm adjusting ring that is in engagement with a presetting ring. This rotation is followed up by a scanning member which is coupled to a variable resistor that is connected in a control circuit for an exposure meter to attain correct adjustment of the diaphragm value and shutter time in conformity with the available light conditions. This exposure adjusting device also is automatically controllable through operative connection of the diaphragm scanning member with a control member which is provided in the unit. The control member movement is initiated and terminated by means of an electromagnetic actuator and arrest respectively with electrical power supply from a unit battery. With the camera detached from the unit, manually presetting the diaphragm is only selective, but the consumption of electrical energy from the camera battery is minimized. The driving torque of the film winding lever, moreover, is reduced by an amount necessary to overcome a strong drive spring for the diaphragm scanning control member.

8 Claims, 4 Drawing Figures

EXPOSURE ADJUSTING DEVICE FOR CAMERA SYSTEM

BACKGROUND OF THE INVENTION

1. Field of the Invention

This invention relates to a camera with a motor drive unit that make it possible to provide an automatic exposure setting device.

2. Description of the Prior Art

Conventional single lens reflex cameras are generally provided with an exposure control apparatus that have shutter time and diaphragm aperture adjusting rings, either of which is manually controlled in accordance with the exposure value. Recently, in the course of development of the camera art toward automatic exposure control, a variety of automatic exposure setting devices have been proposed. These proposed devices automatically adjusting either the exposure time or the diaphragm value. This adjustment is made in accordance with the exposure value determined by the preselected diaphragm value or shutter speed, respectively in combination with the available light conditions. These manual and automatic exposure setting devices have their respective merits, and it can not be said which is superior.

The use of an automatic exposure setting device in the camera, though giving an advantage in simplifying the manipulation necessary for exposure through reducing by one the number of independent manual operating steps, nevertheless necessitates a complicated control circuit with an increase in the electrical drain on the camera battery. To permit satisfactory exposure control apparatus operation without imposing a need for frequent replacement of the battery the capacity and voltage of the battery must be relatively large. Provision also must be made for battery testing and for protecting the battery from unnecessarily running down, or otherwise the chance for taking photographs often would be lost. Particularly with the exposure setting that is adapted to automatically adjust the diaphragm value as a function of a preselected shutter speed, because of the need for a spring-powered driving member that acts on the diaphragm presetting ring, it is difficult to achieve a reduction in the size of a camera that employs a device of the nature. This driving member is operatively connected to a camera reset mechanism which has a film winding lever as an operating member. In this circumstance, if the force of the drive spring is increased to assure the possibility of making snap photography, the driving torque of the film winding lever is correspondingly increased.

To avoid such difficult problems, the manual exposure setting device is preferred except for the somewhat more time-consuming operation of manually adjusting the shutter time or diaphragm value in comparison with the automatic exposure setting device. This manual adjustment is carried out in accordance with an exposure value that is based on reading a display in the field of view of a camera finder. Because of this the electrical circuit this is incorporated in the camera which employs a manual exposure setting device may be made simpler than that of the camera which employs an automatic exposure setting device. Consequently, the electrical power consumption in cameras with manual exposure setting devices is decreased to a large extent. An additional advantage is that, if the adjusted combination of shutter time and diaphragm value is not suited for the contemplated photography, another combination of shutter time and diaphragm value equivalent to the desired exposure value can be provided.

By taking into account the inconsistent features of these two types of devices, it is possible to design the camera so that the manual and automatic exposure condition settings can be selectively controlled. In this case, however, the camera must be provided with a changeover device for selecting either one of the manual and automatic exposure modes. This will contribute to an increase in the complexity of construction and arrangement of the exposure control apparatus and in the size of the camera. More especially in the case of multiple-use cameras with various accessories, the addition of an independent manual operating means is quite disadvantageous in preventing the necessary manipulation from being overlooked when the camera is being readied for operation. In the course of developing a high performance camera system, it has been difficult to achieve compactness for those of the system components which are incorporated in the camera body without sacrificing the accuracy and reliability of exposure and coordination control.

Accordingly, the present invention has for its general object to provide a camera system which achieves the advantages of the conventional manual and automatic exposure setting devices.

An object of the present invention is to provide a method for setting a camera diaphragm in a camera associated with a motor drive unit in a manner that the diaphragm control mechanism is automatically operated with electrical and mechanical power supplies from the unit battery and motor respectively. With the camera detached from the motor drive unit, the diaphragm value is manually adjustable in accordance with the exposure value.

Another object of the invention is to provide a motor driven camera having selective control of the manual and automatic exposure condition settings.

These and other objects and features of the present invention will become apparent from the following detailed description taken in conjunction with the accompanying drawings in which:

DESCRIPTION OF THE PREFERRED EMBODIMENTS

Figure 1:
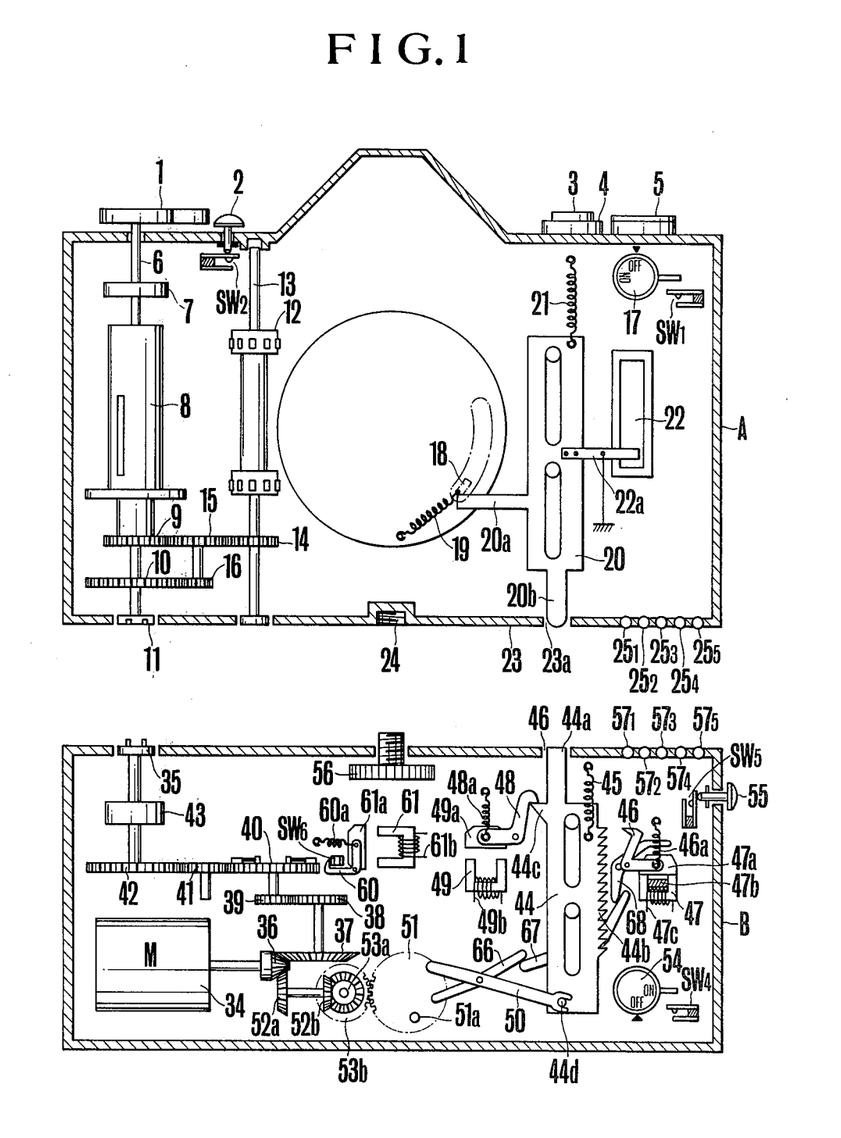
FIG. 1 is a schematic elevational view of one embodiment of an automatic exposure setting device according to the present invention applied to a single lens reflex camera with a motor drive unit being shown about to be attached to the camera body.

In FIG. 1, there is shown a single lens reflex camera A with a motor drive unit B, which upon attachment to the camera drives a film winding mechanism. The film winding mechanism comprises an operating lever 1, a shaft 6 for transmitting the of the lever 1 to a take-up spool 8 through a one-way clutch 7 and a train of gears 9, 10, 15 and 16. A sprocket 12 that is operatively connected to a shaft 13, has a gear 14 that is fixed to the shaft 13. The gear 14 meshes with the gear 15. A coupler 11 receives driving torque from the motor drive unit B.

The camera A further includes an exposure control apparatus having a shutter speed dial 3, a film speed dial 4, a main switch SW1 with a control knob 17 therefor, and a release switch SW2. The release switch SW2 is arranged to be closed when a shutter button 2 is depressed. A film rewinding crank lever is shown in the collapsed position.

Figure 2:
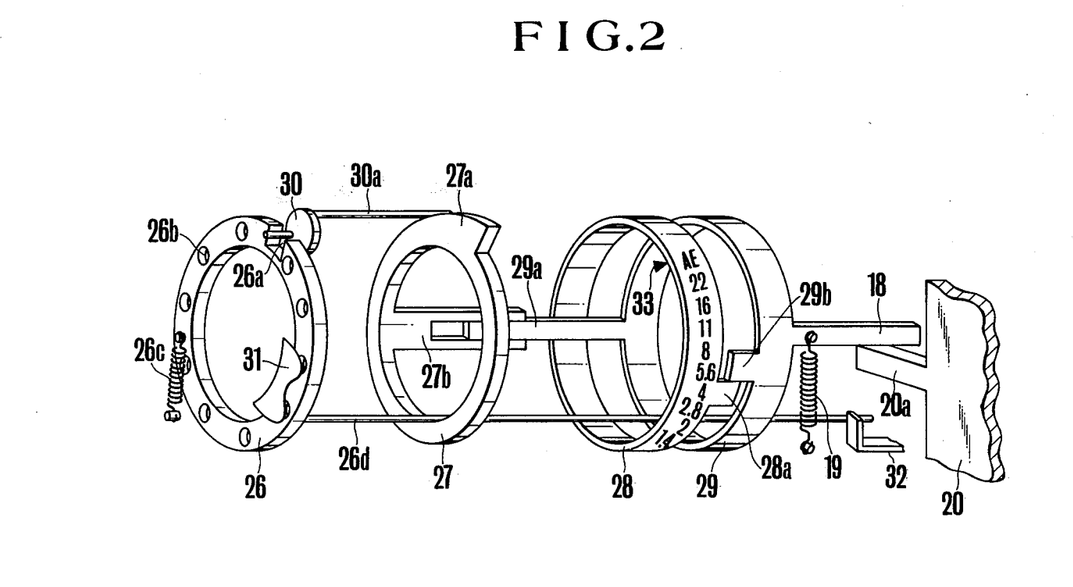
FIG. 2 is a schematic perspective view of the basic parts of a diaphragm mechanism for operation with the device that is shown in FIG. 1.
Figure 4:
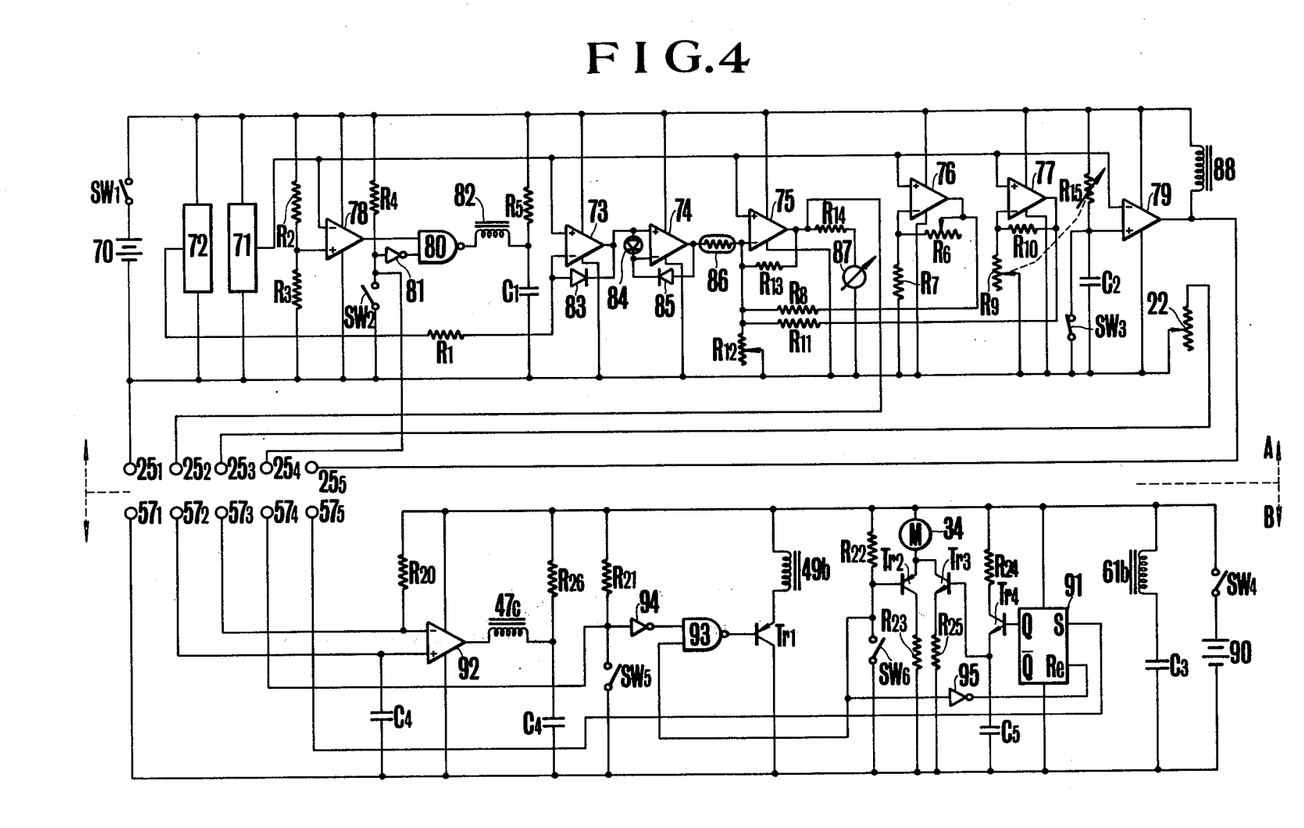
FIG. 4 is a schematic electrical circuit diagram for an exposure control apparatus associated with the device shown in FIG. 1, and control means for coordinating the device with a motor control device.

Referring to FIGS. 1 and 2, a device is shown for manually adjusting the position of a diaphragm mechanism in accordance with the exposure value based on the reading of an exposure meter 87 (FIG. 4). This device comprises a slide bar 20 (FIG. 2) that is arranged to follow up a diaphragm presetting ring 29 while an arm 20a of the slide bar 20 is maintained in abutting engagement against a rearwardly extending projection 18 of the presetting ring 29 under the action of a spring w1 (FIG. 1). The force applied by the spring 21 is weaker than the force of a return spring 19 (FIG. 2) that is connected to the presetting ring 29. A resistance track 22, which constitutes a diaphragm scanning variable resistor together with a slider 22a which is fixed to and carried on the slide bar 20 also are a part of the manual diaphragm adjustment device.

As shown in FIG. 2, the diaphragm mechanism includes, in addition to the presetting ring 29, a rotatable diaphragm ring 26. The ring 26 has a peripheral cutout 26a that cooperates with a bellcrank 30 in order to control the movement of diaphragm blades 31. Each of these blades 31 is provided with a respective pivotal mounting 26b. When an elongated diaphragm closing down pin 26d is turned by a control lever 32 in a clockwise direction against the force of a return spring 26c the size of diaphragm aperture is varied from the full open to the presetting condition. The bellcrank 30 has a rearwardly extending eccentric pin 30a that bears upon a caming surface 27a of a cam ring 27 in order to act as a cam follower. The cam ring 27 is engaged with the diaphragm presetting ring 29 in a shock absorbing manner through the connection of a rearwardly extending forked linkage 27b on the cam ring 27 with a forwardly extending projection 29a on the diaphragm presetting ring 29. A diaphragm ring 28 is rotatably mounted on an interchangeable lens barrel (not shown) and has a lug 28a that normally bears upon a lug 29b of the presetting ring 29 with the help of a click stop (also not shown). This combination overcomes the force of the return spring 19. Accordingly, as the diaphragm ring 28 is turned manually to place a desired diaphragm value ranging from 1.4 to 22 in registry with a stationary index 33 on the lens barrel, the resultant position of the presetting ring 29 is translated into a corresponding size of aperture opening as defined by the diaphragm blades 31 during the actual exposure period. With the diaphragm ring 28 when set in "AE" position, that is beyond the upper limit of the diaphragm value range, the slide bar 20 acts as a scanning member assumes the downmost position illustrated in FIG. 1. In this position the end of a downwardly extending projection 20b on the slide bar 20 (FIG. 1) is disposed in a hole 23a that is provided in the wall of the bottom panel of the camera housing.

Turning to FIG. 1 again, the motor drive unit includes an electric motor M. The output from the motor M is transmitted to a coupler 35 through a train of gears 36 to 42 and through a one-way clutch 43. The motor drive unit B is attached to the camera body A by means of a screw fastener 56 that engages a threaded portion 24 of the camera housing. In this manner there is established a motor driven camera that has an automatic diaphragm adjusting device.

Positioned within the motor drive unit B and in longitudinal alignment with the scanning slide 20 is a control slide 44. The slide 44 tends to move a projection end 44a upwards into driving engagement with the projection 20b of the slide bar 20 under the influence of by a tension spring 45 that is connected between the slide 44 and the unit housing. One side of the control slide 44 also has a toothed portion 44b for engaging an arresting pawl lever 46. The operation of the pawl lever 46 is controlled by a first electromagnetic actuator 47, a lug 44c on the control 44 is arranged upon setting in the downmost position to be latched by a pawl lever 48. Operation of the pawl level 48 is controlled by a second electromagnetic actuator 49. Thus, if the solenoid 49b of the second actuator 49 is energized in response to a signal from the release switch SW2 from a common battery that is shared with the motor 34 the latching lever 48 is turned in a counter-clockwise direction against the action of the bias spring 48a. This movement occurs because an armature 49a that is carried on the tail of the lever 48 is attracted toward the electromagnet 49.

As the scanning slide 20 is driven upwards by the control slide 44, when the output of the variable resistor 22 reaches a value that is dependent upon the exposure value, the solenoid 47c of the first electromagnet is energized from the unit battery to cancel the magnetic field of a permanent magnet piece 47b. In this circumstance, the armature 47a is moved away from the magnet 47, causing the arresting pawl lever 46 to be turned in a counter-clockwise direction under the action of a spring 46a until the pawl lever 46 engages one of the teeth 44b on the control slide 44b.

A mechanism is provided for resetting the arresting pawl lever 46 and the control slide 44 while overcoming the loadings of the springs 46a and 45 respectively during the film winding and shutter cocking operation. This mechanism comprises a gear 51 that meshes with a small gear 53b, bevel or mitre gears 52b and 53a, skew bevel gear 36 and a meshing level gear 52a. As shown in FIG. 1, the gear 36 is connected to the output shaft of the motor 34.

First and second control levers 66 and 50 respectively each ends that extend into the path of travel of an eccentric pin 51a on the gear 51. The opposite ends of the control levers 66 and 50 an each respectively engage intermediate lever 67 and a pin 44d. The control levers 66 and 50 are arranged to be struck in timed relation by the pin 51a to enable the arresting lever 46 to first disengage the toothed portion 44b through clockwise movement of an escapement lever 68 in response to movement of the intermediate lever 67. After the disengagement of the arresting lever 46 from the toothed portion is complete, the control slide 44 is moved downward to the initial latched position. Thus the automatic diaphragm adjusting device is reset while the energized motor M loads the springs 45 and 46a.

A switch SW6 in the motor unit B prevents accidental release of the control slide 44 either toward the end of a cycle of motor operation, or if the film winding mechanism in the camera body A is not ready for exposure operation. As shown in FIG. 1, the switch SW6 is activated in response to movement of a control knob 54. Thus, turning the control knob 54 briefly looses a main switch SW4. The closed main switch SW4 energizes a solenoid 61 which attracts an armature 61a. The armature 61a, being attracted to the solenoid 61, turns the lever 60 in a clockwise direction against the force of a bias spring 60a.

Figure 3:
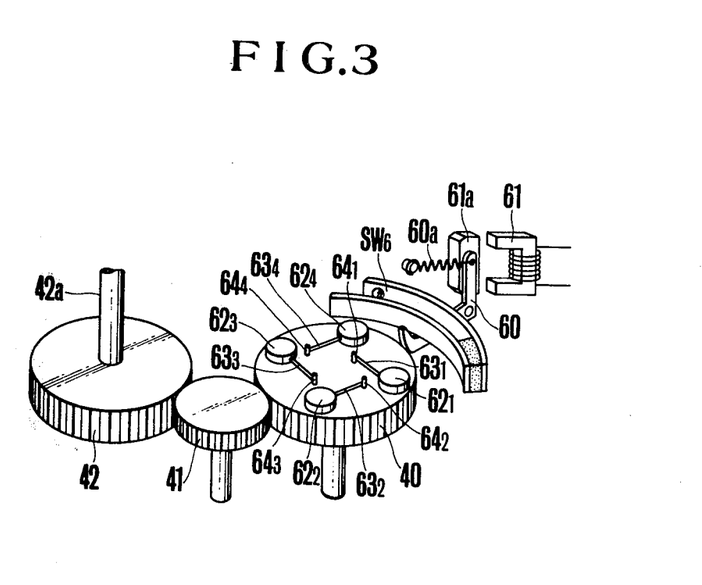
FIG. 3 is a fragmentary perspective view showing an example of arrangement of a switch for controlling the operation of an electromagnetic actuator for the device that is shown in FIG. 1.

As best shown in FIG. 3 movable contact element of switch SW6 has an arcuate shape that is concentric with the intermediate gear 40. The switch SW6 is positioned adjacent to the gear 40 to permit contrifugal force, when the gear is rotated to swing four round weights 62 outwardly of the axis of the gear 40. The weights 62 are supported by respective ends of resilient bars 63, the opposite ends 64 of which are fixed. In this circumstance, centrifugal force causes the weights 62 to press the movable contact element into engagement with the fixed contact element of the switch SW6, thereby closing the switch. When rotation of the gear 40 is stopped, the weights 62 are retracted from engagement with the movable contact and permit the switch SW6 to open. The switch SW6 also serves to sustain the energization of the motor M after the motor M is activated at the time the shutter is closed.

FIG. 4 shows the circuitry of the motor driven camera of FIGS. 1 to 3. The upper half section of the circuit incorporated in the camera body A, and the lower half section in the unit B, wherein the same reference characters have been employed to denote the similar parts to those shown in FIGS. 1 to 3. The circuit A includes a camera release control circuit, a light measuring circuit, an exposure value computing circuit, a timing circuit and a switching circuit that is responsive to the timing circuit for energizing and de-energizing a solenoid 88 for a shutter control electromagnet, as explained below.

The release control circuit comprises resistors R2 and R3 that are connected in series between the positive and negative terminals of a battery 70 to provide a voltage divider. A comparator 78 has a "+" input connected to the output of the voltage divider and with a "−" input that is connected to the output of a first constant voltage source 71. A first input to a NAND gate 80 is connected to the output of the comparator 78. The second input the NAND gate 80 is coupled to a point between a resistor R4 and the switch SW2 (FIG. 1 also) through an inverter 81. In these circumstance, if the voltage of the batter 70 is above a satisfactory operating level, as determined by the reference voltage Vc of the source 71, the closure of the switch SW2 enables the NAND gate 80 to change its output from high to low level. The low level signal output from the NAND gate 80 energizes a camera release actuating solenoid 82 through a pulse from a capacitor C1, which accumulated the stored charge through a resistor R5.

The light measuring circuit comprises a photosensitive element 84 such as a silicon photo-cell. The photosensitive element 84 is connected across the the input terminals of an operational amplifier 74. A logarithmic compression diode 85 also is connected in the feedback network of the amplifier 74 that couples an, input terminal to the output terminal of the amplifier 74.

A temperature compensator for eliminating the influence of temperature on the reverse saturation current of the diode 85 also is provided in order to stabilize the light measurement accuracy. The temperature compensator comprises an operational amplifier 73 that has a non-inversion input terminal connected to the output of the first constant voltage source 71. The inversion input terminal of the amplifier 73 however, is connected to the output of a second constant voltage source 72 which provides a higher voltage KVc than the voltage Vc of the first constant voltage source 71. A diode 83 also connected between the inversion input terminal and the output terminal of the operational amplifier 73. The output of the operational amplifier 73, in turn, is connected to the non-inversion input terminal of the operational amplifier 74.

A film speed setting variable resistor R6 is connected between the inversion input terminal and output terminal of an operational amplifier 76. The inversion input terminal of the amplifier 76 is connected through a resistor R7 to the negative bus. The non-inversion input terminal of the amplifier 76, however, is connected to the output of the first constant voltage source 71.

A pair of shutter speed setting variable resistors R9 and R15 mechanically are linked or "ganged" with each other as schematically shown by a dashed line in FIG. 4. The resistor R9 is connected between the inversion input terminal of an operational amplifier 77 and the negative bus. The resistor R15, in contrast, is connected in series with a timing capacitor C2 to form this aforesaid aforesaid timing circuit. A feedback resistor R10 is connected between the inversion input and output terminals of the operational amplifier 77 whose non-inversion input is connected to the output of the voltage source 71. The outputs of the operational amplifiers 76 and 77 are combined with each other. They also are combined with the outputs from the operational amplifier 74 and an aperture correction factor setting variable resistor R12 by an adder. The adder comprises an operational amplifier 75 with its non-inversion input connected to the output of the constant voltage source 71. The inversion input of the amplifier 75 is connected to the output of the amplifier 74 through a temperature responsive resistor 86. This inversion input to the amplifier 75 also is connected to the variable resistor R12, and to the operational amplifiers 76 and 77 through respective resistors R8 and R11. A feedback resistor R13, further, connected between the inversion input and output of the operational amplifier 75. The output of the adder is applied both to the an electric exposure meter 87 through a resistor R14 for manual diaphragm adjusting purposes and to the circuit B through a terminal $25_2$-and-terminal $57_2$ connection for automatic diaphragm adjusting purposes.

Connected across the timing capacitor C2 is a count start switch SW3 arranged to be opened when a shutter (not shown) is actuated to open. When the time variable voltage on the timing capacitor C2 has reached a level termed the trigger voltage during an interval of time corresponding to the preselected shutter time, the switching circuit, or a comparator 79 changes its output from high to low level in order to permit the battery 70 to energize the solenoid 88.

The circuit B includes a separate electrical power source or battery 90, a capacitor C3 connected in series to a solenoid winding 61b (also FIG. 1 or FIG. 3) across the battery 90 through the main switch SW4. A flip-flop 91 has its set input S connected through a terminal $57_5$-and-terminal $25_5$ connection to the output of the comparator 79 in block A, the reset input Re of the flip-flop 91B connected through an inverter 95 to a junction point between a resistor R22 and the switch SW6 (the FIG. 1 or FIG. 3), and a motor drive circuit.

This circuit motor drive comprises a transistor Tr2 with its emitter connected to one end of a motor winding 34. The opposite end of the motor winding 34 is connected to the positive terminal of the battery 90 through the switch SW4. The collector of the transistor Tr2 is connected through a resistor R23 to the negative terminal of the battery 90. The base of the transistor Tr2 is connected to the junction point between the resistor R22 and the switch SW6.

A transistor Tr3 with its collector connected to the motor winding 34 at the same end as that of the transistor Tr2, has its emitter connected through a resistor R25 to the negative terminal of the battery 90. The base moreover, of the transistor Tr3 is coupled to a point on a connection between a capacitor C5 and an emitter of a transistor Tr4. As shown in FIG. 4 the collector is connected of the transistor Tr4 to the positive bus, and the base is connected to an output Q of the flip-flop 91.

The circuit of the automatic diaphragm adjusting device comprises a switching transistor Tr1, the emitter of which is connected to one terminal of the solenoid winding 49b of the release control electromagnet 49. The other terminal of the solenoid winding 49b is connected to the positive bus. The collector of the transistor Tr1 is connected to the negative bus, and the base is connected to the output of a NAND gate 93. As illustrated, the NAND gate 93 has two inputs, one of which is connected to the junction point between the resistor R22 and the switch SW6. Another input to the NAND gate 93 is connected to the camera release switch SW2 through a path that includes a junction point between a resistor R21 and a release switch SW5, an inverter 94 and a terminal 57₄-and-terminal 25₄ connection.

A comparator 92 has an inversion input terminal coupled through a resistor R20 to the positive bus. This inversion input terminal, however, and also is coupled to the output of the diaphragm presetting responsive variable resistor 22 through a terminal 57₃-and-terminal 25₃ connection. The non-inversion input of the comparator 92 is connected through a capacitor C4 to the negative bus. This non-inversion input also is coupled to the output of the adder in block A. This latter connection permits the capacitor C4 to charge to a level which is dependent upon the output voltage of the comparator 75 and which represents an exposure value. A solenoid 47c of arresting control electromagnet is connected between the output of comparator 92 and a connection between a resistor R26 and a capacitor C4. Hence the solenoid 47c is energized by a pulse.

The operation of the camera with or without the motor drive unit is as follows: At first, the camera is assumed to operate in the manual exposure mode. To set exposure conditions, the operator will first turn the film speed dial 4 to place a graduation representative of the sensitivity of the associated film in registry with an index (not shown). In this manner the variable resistor R6 (FIG. 4) is operated to provide a corresponding resistance value. Next, a desired shutter speed is set in the variable resistors R9 and R15 by turning the shutter speed dial 3 (FIG. 1). After that, when the control knob 17 is moved to ON position, the power switch SW1 is closed, causing the voltage of the battery 70 (FIG. 4) to appear across the positive and negative buses for the first and second constant voltage sources 71 and 72, two operational amplifiers 73 to 77 and the comparators 78 and 79. This causes the output voltage Vc of the first constant voltage source 71 to be applied to the non-inversion inputs of the operational amplifiers 73, 75, 76 and 77 and also to the first inputs of the comparators 78 and 79. In this circumstance the operational amplifier 76 produces an output voltage proportional to the set value of film speed which is then applied to the non-inversion input of the operational amplifier 75. The operational amplifier 77 also produces an output voltage proportional to the set value of shutter speed which too is applied to the non-inversion input of the operational amplifier 75.

At the same time, the voltage KVc of the second constant voltage source 72 is applied to the inversion input of the temperature compensating operational amplifier 73 to provide an output voltage which is then applied to the non-inversion input of the light-measuring operational amplifier 74. In this manner, the output of the light-measuring operational amplifier 74 is freed from the influence of the saturation current in the reverse direction of the logarithmic compression diode 85 which is apt to vary with temperature, accordingly, the output from the amplifier 74 corresponds to the level of brightness of an object to be photographed with high accuracy. This output from the operational amplifier 74 is applied through the temperature compensating resistor 86 to the exposure value computing operational amplifier 75. Also applied to the inversion input of the operational amplifier 75 is the output voltage of the variable resistor R12 which represents full open aperture corrective information. In summary, responsive to the film speed information, brightness information, shutter speed information and full open aperture corrective information, the operational amplifier 75 produces an output voltage representative of an effective exposure value, that is, a diaphragm value to which the camera diaphragm is to be adjusted manually or automatically. As the output of the operational amplifier 75 is applied to the meter 87, upon the reading of the meter 87, the operator needs to turn the diaphragm ring 28 (FIG. 2) to place a diaphragm value graduation representative of the exposure value in registry with the index 33. The movement of the diaphragm ring 28 is followed up by movement of the diaphragm presetting ring 29 along with the cam ring 27 to adjust the position of the bellcrank 30.

If the voltage of the battery 70 (FIG. 4) is above the satisfactory operating level as is detected at the time of closure of the power switch SW1, the voltage appearing at the junction point between the resistors R2 and R3 is higher than the constant voltage Vc, causing the comparator 78 to produce an output voltage of high level. Therefore, after the adjustment of the diaphragm value is completed, the operator may depress the shutter button 2 (FIG. 1) to close the release switch SW2. The closure of the switch SW2 changes the output of the NAND gate 80 (FIG. 4) to the low level, enabling the charge on the capacitor C1 to discharge through the solenoid 82 of the release control electromagnet. The energized solenoid 82 produces a magnetic flux which cancels the magnetic flux of the permanent magnet that is associated therewith, and the armature is induced to start movement of the diaphragm closing down member 26d (FIG. 2) by the lever 32. In this manner, the diaphragm blades 31 are closed down from the full open aperture position to the presetting of the bellcrank 30 to form a proper diaphragm opening that corresponds to the manually set value on the diaphragm ring 28. The movement of the diaphragm is followed by upward movement of a mirror (not shown) which is then followed by the start of running down of a front shutter curtain (not shown).

At this time, the count start switch SW3 (FIG. 4) is opened. During a time interval equal to the set value of shutter speed that is determined by the variable resistor R15 and capacitor C2, the capacitor C2 is charged to the trigger voltage at which the comparator 79 changes its output from the low to high level. This change in the output signal from the comparator 79 enables the solenoid 88 to de-energized to release a rear shutter curtain (not shown) from a latching connection to terminate the film exposure. In response to this, the mirror (not shown) and the diaphragm blades 31 (FIG. 2) are returned to their initial positions. Subsequently, the operator may cock the film operating lever 1 to drive the sprocket 12 and the take-up spool 8 through the gear trains 9, 10, 15, 16 and 14 in order to advance the film through the length of one frame while the exposed film is being wound up on the take-up spool 8. Corking the operating lever/also resets the shutter and release mechanisms. In this way, the camera is readied for the next exposure operation.

For automatic exposure operation, the motor drive unit B is attached to the camera body A. The drive coupling 35 is aligned with the driven coupler 11, the unit B is secured to the camera body A secured by threading the screw 56 into the threaded portion 24, to permit the terminals $57_1$ to $57_5$ to establish an electrical contact with the respective terminals $25_1$ to $25_5$.

After setting the shutter speed and the film speed in a manner similar to that disclosed in connection with the manual exposure mode, the operator turns the diaphragm ring 28 (FIG. 2) to "AE" position. When the control knob 17 (FIG. 1) is turned on to close the switch SW1, the exposure value computing circuit produces an output representative of the proper diaphragm value which is displayed on the meter 87 (FIG. 4). At the same time, the capacitor C4 is charged to a voltage dependent upon the output voltage of the operational amplifier 75.

When the power switch SW4 of the unit is closed by turning the control knob 54 (FIG. 1), the solenoid 61b (FIG. 4) is energized for a very short period of time, a period of time that is equal to that which is necessary to fully charge the capacitor C3. As the switch SW6 is instantaneously closed by the lever 60 (FIG. 1) when the armature 61a attracted toward the energized solenoid 61b, the motor winding 34 (FIG. 4) is connected to the battery 90 by means of the conducting transistor Tr2.

Assuming that the winding operation of the camera body A is completed, then the driven coupler 11 (FIG. 1) is maintained stationary and the rotation of the motor M is stopped. Because the period during which the motor winding 34 is energized is limited to a very small value, no large stress is applied to the film winding mechanism.

Alternatively, assuming that the film winding mechanism is not set yet, then the energization of the solenoid 61b (FIG. 4) permits the the motor M to rotate. Thus motion of the motor M is transmitted through the train of gears 36 to 42 (FIG. 1) and through the one-way clutch 43 to the driven coupler 11. This motion is further transmitted from the coupler 11 and the train of gears 9, 10, 14, 15 and 16 to the sprocket 12 and the take-up spool 8. As the gear 40 is rotated, moreover, the round weights $61_1$, $62_2$, $62_3$ and $62_4$ (FIG. 3) are swung outwardly of the gear 40 by centrifugal force to continue the closure of the switch SW6 during the time subsequent to the instantaneous closure of the switch SW6. This action continues until one cycle of the film winding operation is completed. When the film winding operation is completed, the switch SW6 is opened and the transistor Tr2 (FIG. 4) is rendered non-conducting to terminate energizing the motor winding 34. With the switch SW6 open, the second input of the NAND gate 93 is maintained at high level.

When the release button 55 (FIG. 1) is depressed to close the switch SW5, the inverters 81 and 94 (FIG. 4) change their respective outputs to high levels. These high level inverter output signals 80 and 83 also to change their outputs to low leads. At these low level NAND gate outputs the solenoid 82 of camera release control electromagnet is instantaneously energized. The transistor Tr1 also is rendered conducting in order to energize the solenoid 49b which, in accordance with the invention, controls the start of the scanning movement of the automatic diaphragm adjusting device.

As the energized solenoid 49b (FIG. 1) attracts the armature 49a against the force of the spring 48a to turn the lever 48 in a counter-clockwise direction, the control slide 44 is released from engagement with the latching lever 48. In these circumstances the control slide 44 is drawn upward by the action of the tension spring 45. The scanning slide bar 20 also is driven in the same direction against the force of the spring 19, thereby turning the diaphragm presetting ring 29 in a counter-clockwise direction about the axis of the objective lens (not shown). At the same time the position of the presetting ring 29 is scanned by the variable resistor 22. When the voltage appearing at a point on the connection between the variable resistor 22 (FIG. 4) and the fixed resistor R20 exceeds the voltage on the capacitor C4, the output of the comparator 92 changes to a low level. This low level signal causes the solenoid 47c to be energized with a sudden current that is supplied from the capacitor C4. Energizing the solenoid 47c cancels the magnetic field of the permanent magnet 47b (FIG. 1), thereby enabling the arresting lever 46 to be turned by the spring 46a and to engage one of the teeth 44b.

At this time, the control slide 44, and the associated slide bar 20 are stopped from further upward movement thus fixing the amount of movement of the diaphragm presetting ring 29 (FIG. 2). The determination of the final position of the presetting ring 29 also fixes the angle of rotation of the bellcrank 30 through movement of the cam ring 27.

On the other hand, when the output of the NAND gate 80 (FIG. 4) is changed to a low level output, the solenoid 82 is energized to release the camera. In this situation, the diaphragm control lever 32 (FIG. 2) is operated to move the elongated diaphragm closing down pin 26d. During this diaphragm setting period, the size of the diaphragm opening is varied from the maximum possible value to the proper diaphragm value based on the final position of the bellcrank 30. Subsequently, the mirror (not shown) is flipped upward, followed by an opening of the shutter (also not shown). With the simultaneous opening of the switch SW3 (FIG. 4). At the end of a time interval that is determined by the time constant of the timing circuit R15 and C2, the comparator 79 changes its output from the low lead to the high level whereupon the solenoid 88 is de-energized to close the shutter.

This change in the output signal of the comparator 79 sets the flip-flop 91, causing and therefore the output stage Q to produce a high level voltage that is applied to the base of the transistor Tr4. The transistor Tr4 then changes the capacitor C5 through the resistor R24. In a predetermined time interval, the voltage on the capacitor C5 reaches a threshold level for the transistor Tr3 that will enable the motor winding 34 to energize. Motion of the motor M is transmitted through the gears 36 to 42 (FIG. 1) and through the one-way clutch 43 to the drive coupling 35 and therefrom to the coupling 11 in order to drive the film winding mechanism.

During this film winding operation, the automatic diaphragm adjusting device is operated by the driving torque of the motor M and is reset in the following manner. As the large gear 51 is rotated by the motor M through the train of gears 36, 52a, 52b, 53a and 53b, the first control lever 66 engages the eccentric pin 51a and is turned in a clockwise direction. This movement of the lever 66 is transmitted through the intermediate lever 67 to turn the escapement lever 68 in a clockwise direction. The escapement lever 68, turning in a clockwise direction brings the armature into the attractive magnetic field of the permanent magnet 47b against the force of the spring 46a. This sequence of operation disengages the arresting lever 46 from the control slide 44. A short time after the eccentric pin 51a engages the lever 66, the pin 51a also engages the second control lever 50 and turns the latter in the clockwise direction. Thus engaged, the second control lever 50 misses the slide 44 downwardly against the force of the tension spring 45 until the slide 44 is latched by the pawl lever 48 at the lug 44c. After the device is reset, the eccentric pin 51a is moved away from the levers 66 and 50, as the gear 51 is further rotated to complete one revolution for each cycle of film winding operation.

Soon after the start of rotation of the motor M, the centrifugal switch SW6 is closed, causing the output of the inverter 95 (FIG. 4) to change to the high level at which the flip-flop 91 is reset to produce a high level output at Q. This high lead output sequal at Q turns off the transistors Tr4 and Tr3 in sequence. The closure of the centrifugal switch SW6, however, sustains the energization of the motor winding 34 and also causes the output of the NAND gate 93 to change to the high level. A high lead output from the NAND gate 93 renders the transistor Tr1 non-conducing in order to deenergize the solenoid 49b, before the control slide 44 (FIG. 1) is moved to the downmost position.

When the film winding operation has been completed, the motor M is braked to stop the gear 40. As the weights 62 are swung backward, the centrifugal switch SW6 is opened, thereby rendering the transistor Tr2 (FIG. 4) non-conducting in order to terminate the motor winding 34 energization. Opening the switch SW6 also causes a high level voltage to appear at the second input to the NAND gate 93. Accordingly, at this time, if the depressing force is withdrawn from the release button 55 (FIG. 1) to open the switch SW5 (FIG. 4), the low level voltage at the first input of the NAND gate 93 prevents the next time actuation of the camera. As a result, a single frame operation was performed with the motor driven camera. If the release button 55 remains depressed, because of the high level at the first input of the NAND gate 93 the next cycle of camera operation starts to perform at the same time as the centrifugal switch SW6 is opened. Thus, a series of continuous frame exposures can be taken in the automatic diaphragm control mode.

With the motor driven camera, it is of course possible to make exposures in the manual mode provided that the control knob 54 (FIG. 1) is set in OFF position with the power switch SW4 is open. It is to be noted here that the selection of either one of the manual and automatic modes can be effected only by operating the control knob 54. Although the foregoing discussion has been conducted with the release button 55 of the unit B as an operating member for the entire system, the shutter button 2 may be used to effect an equivalent result.

It will be understood from the foregoing description that a single lens reflex camera embodying the invention is provided with a manual diaphragm adjusting device to reduce the complexity and size of the camera structure. The motor drive unit of the invention is provided with an electronically operated control mechanism for the diaphragm adjusting device of the camera that takes into account the availability of a relatively large spare space within the unit housing and also the electrical and mechanical driving power necessary to perform a series of continuous exposures. For this reason, the driving torque of the film winding lever is not increased. Such features of the camera system of the invention enable the photographer to more easily manage performing snap photography.

What is claimed is:
1. An exposure control apparatus for a camera removably equipped with a motor drive unit comprising:
  A. a first system mounted in the camera and having:
   (a) light measuring means arranged to receive light and capable of producing an electrical signal proportional to the level of brightness of an object being photographed;
   (b) manually operable shutter speed setting means to set a desired shutter speed value and capable of producing an electrical signal proportional to the set value of shutter speed;
   (c) exposure value computing means responsive to the electrical signals from said light measuring and said shutter speed setting means for producing an output representative of an exposure value;
   (d) a diaphragm device, the aperture of which is adjustable either manually or automatically in accordance with the computed exposure value obtained through computation performed by said exposure value computing means;
   (e) movable means operatively connected to said diaphragm device;
   (f) signal forming means for producing an electrical signal proportional to the amount of movement of said movable means;
   (g) a first terminal arranged to have the output of said exposure value computing means applied thereto; and
   (h) a second terminal arranged to have the output of said signal forming means applied thereto; and
  B. a second system mounted in said motor drive unit to be attached to said camera, said second system having:
   (i) a third terminal arranged to electrically contact said first terminal;
   (j) a fourth terminal arranged to electrically contact said second terminal;

(k) diaphragm adjusting means arranged to operate in response to a release actuation of the camera for actuating said movable means;

(l) locking means for stopping adjustment operation of said diaphragm adjusting means; and (m) control means for comparing the computation output of said exposure value computing means received from said third terminal with the output of said signal forming means received from said fourth terminal and for actuating the locking means when the difference between the value of the two outputs reaches a predetermined value, whereby automatic control over said diaphragm device becomes possible when said motor drive unit is attached to said camera body.

2. An exposure control apparatus according to claim 1, wherein said motor drive unit further includes drive means for performing winding up for said camera body and means for resetting said diaphragm adjusting means in connection with said driving means when said driving means is operated.

3. An exposure control appratus according to claim 2, wherein said motor drive unit further includes actuating means for actuating said diaphragm adjusting means and release control means for operating said actuating means.

4. An exposure control appratus according to claim 3, wherein said motor drive unit further includes electrical power supply means for supplying electrical power to said actuating means and said driving means, and a switch for controlling said electrical power supply, whereby when said switch is closed, the diaphragm device in said camera body is automatically driven, and when said switch is open, said diaphragm device in said camera body is manually driven.

5. An exposure control apparatus according to claim 3, wherein said camera body further includes a second actuating means for actuating the internal mechanism of said camera body and another release control means for operating said second actuating means, whereby both of said actuating means are operated by use of one of said two release control means.

6. An exposure control apparatus for a camera removably equipped with a motor drive unit comprising:

A. a first system mounted in the camera and comprising:

(a) light measuring means arranged to receive light and capable of producing an electrical signal proportional to the level of brightness of an object being photographed;

(b) shutter speed setting means manually operable to set a desired shutter speed value and capable of producing an electrical signal proportional to the set value of shutter speed;

(c) exposure value computing means responsive to the electrical signals from said light measuring and said shutter speed setting means for producing an output representative of an exposure value;

(d) a diaphragm device having aperture presetting means for determining the aperture of said diaphragm, said aperture presetting means being manually or automatically adjustable in accordance with a computer value obtained by said exposure value computing means;

(e) electromagnetic release means arranged to perform a release action for the camera;

(f) release signal producing means for producing a release signal to actuate said electromagnetic release means, said release signal producing means having a switch and being arranged to produce the release signal when said switch is closed;

(g) stopping-down means which operates to stop down said diaphragm device in relation to the operation of said electromagnetic release mans;

(h) a movable member operatively connected to said diaphragm presetting means;

(i) signal forming means for producing an electrical signal proportional to the amount of movement of said movable member;

(j) shutter control means for determining an exposure time based on the set value of said shutter speed setting means;

(k) a first terminal arranged to have the output of said exposure value computing means applied thereto;

(l) a second terminal arranged to have the release signal from said release signal producing means applied thereto;

(m) a third terminal arranged to have the electrical signal from said signal forming means applied thereto; and B. a second system mounted in said motor drive unit to be attached to the camera body, said second system having:

(n) a fourth terminal for contacting said first terminal when the drive unit is attached to the camera body;

(o) a fifth terminal for contacting said second terminal when the drive unit is attached to the camera body;

(p) a sixth terminal for contacting said third terminal when the drive unit is attached to the camera body;

(q) a diaphragm adjusting member for actuating said movable member when the drive unit is attached to the camera body;

(r) starting means for starting said diaphragm adjusting member when a release signal is applied thereto from said fifth terminal;

(s) locking means for stopping adjustment operation of said diaphragm adjusting member;

(t) accumulating means for accumulating the computation output of said exposure value computing means received from said fourth terminal; and (u) comparison means for comparing the output value of said signal forming means received from said sixth terminal with an accumulated value obtained from said accumulating means and for producing a signal to actuate said locking means when the difference between the two compared values reaches a predetermined value, whereby, when said motor drive unit is attached to said camera body, said diaphragm presetting means is automatically set by said diaphragm adjusting member.

7. An exposure control apparatus according to claim 6, wherein said locking means has an engaging member for engaging with said diaphragm adjusting member and an electromagnet with a permanent magnet for controlling operation of said engaging member in response to the signal from said comparing means.

8. An exposure control apparatus according to claim 6, wherein said motor drive unit further includes driving means for performing winding up for said camera body and means for resetting said diaphragm adjusting member in response to said driving means and for releasing said engaging member from the engaged position.

* * * * *